(12) United States Patent  (10) Patent No.: US 9,079,213 B2
Whitbeck et al.  (45) Date of Patent: Jul. 14, 2015

(54) METHOD OF DETERMINING COATING UNIFORMITY OF A COATED SURFACE

(75) Inventors: Rodney G. Whitbeck, Northville, MI (US); Benjamin T. Tower, Canton, MI (US); David Alan Stephenson, Detroit, MI (US); Keith Raymond Bartle, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 13/538,151

(22) Filed: Jun. 29, 2012

(65) Prior Publication Data

US 2014/0004255 A1    Jan. 2, 2014

(51) Int. Cl.
| | |
|---|---|
| *B05D 1/02* | (2006.01) |
| *C23C 4/12* | (2006.01) |
| *C23C 4/18* | (2006.01) |
| *G01B 21/08* | (2006.01) |
| *G01B 21/20* | (2006.01) |
| *B05B 7/22* | (2006.01) |
| *B05B 12/08* | (2006.01) |
| *B05B 13/06* | (2006.01) |
| *F02B 77/02* | (2006.01) |

(52) U.S. Cl.
CPC . *B05D 1/02* (2013.01); *B05B 7/224* (2013.01); *B05B 12/084* (2013.01); *B05B 13/0636* (2013.01); *C23C 4/12* (2013.01); *C23C 4/18* (2013.01); *F02B 77/02* (2013.01); *G01B 21/08* (2013.01); *G01B 21/20* (2013.01)

(58) Field of Classification Search
USPC ............ 702/171; 428/141, 143; 427/8; 3/171
See application file for complete search history.

(56) References Cited

U.S. PATENT DOCUMENTS

| | | |
|---|---|---|
| 3,031,330 A | 4/1962 | Hornick et al. |
| 3,114,960 A | 12/1963 | Einaudi |
| 3,325,496 A | 6/1967 | Haracz |

(Continued)

FOREIGN PATENT DOCUMENTS

| | | |
|---|---|---|
| DE | 4411296 A1 | 7/1995 |
| DE | 19508687 | 10/1995 |

(Continued)

OTHER PUBLICATIONS

European Patent Office, European Search Report for the corresponding European Patent Application No. 12192730.5-1353 mailed Feb. 21, 2013.

(Continued)

*Primary Examiner* — Nathan T Leong
(74) *Attorney, Agent, or Firm* — Damian Porcari; Brooks Kushman P.C.

(57) ABSTRACT

A method for applying a coating includes: obtaining a subject cylindrical part including an inner subject coated surface applied using a spraying device at a first operating condition, the inner subject coated surface including a longitudinal axis and a cross-section, the cross-section intersecting the longitudinal axis at a center point and including end points located on an outer perimeter; measuring the inner subject coated surface to obtain subject coating data including distance values, each being a distance between the center point and one of the end points; comparing the subject coating data to standard coating data to obtain comparison data; and adjusting the spraying device based on the comparison data to have a second operating condition different from the first operating condition.

20 Claims, 6 Drawing Sheets

(56) References Cited

U.S. PATENT DOCUMENTS

| | | | |
|---|---|---|---|
| 3,833,321 A | 9/1974 | Telang et al. | |
| 4,324,017 A | 4/1982 | Viehe | |
| 4,646,479 A | 3/1987 | Walker et al. | |
| 5,050,547 A | 9/1991 | Takahashi | |
| 5,107,967 A | 4/1992 | Fujita et al. | |
| 5,194,304 A | 3/1993 | McCune, Jr. et al. | |
| 5,212,738 A * | 5/1993 | Chande et al. | 382/152 |
| 5,239,955 A | 8/1993 | Rao et al. | |
| 5,332,422 A | 7/1994 | Rao | |
| 5,363,821 A | 11/1994 | Rao et al. | |
| 5,380,564 A | 1/1995 | VanKuiken, Jr. et al. | |
| 5,466,906 A | 11/1995 | McCune et al. | |
| 5,480,497 A | 1/1996 | Zaluzec et al. | |
| 5,481,084 A | 1/1996 | Patrick et al. | |
| 5,622,753 A * | 4/1997 | Shepley et al. | 427/453 |
| 5,648,122 A | 7/1997 | Rao et al. | |
| 5,691,004 A | 11/1997 | Palazzolo et al. | |
| 5,820,938 A | 10/1998 | Pank et al. | |
| 5,922,412 A * | 7/1999 | Baughman et al. | 427/449 |
| 5,931,038 A | 8/1999 | Higashi | |
| 5,958,520 A | 9/1999 | Cook et al. | |
| 5,958,521 A | 9/1999 | Zaluzec et al. | |
| 5,997,286 A | 12/1999 | Hemsath et al. | |
| 6,328,026 B1 | 12/2001 | Wang et al. | |
| 6,395,090 B1 | 5/2002 | Shepley et al. | |
| 6,441,619 B1 | 8/2002 | Araki et al. | |
| 6,589,605 B2 | 7/2003 | Shepley et al. | |
| 6,622,685 B2 | 9/2003 | Takahashi et al. | |
| 6,856,866 B2 | 2/2005 | Nakao | |
| 6,863,931 B2 | 3/2005 | Someno et al. | |
| 6,914,210 B2 | 7/2005 | Grossklaus, Jr. et al. | |
| 7,089,662 B2 | 8/2006 | Izquierdo et al. | |
| 7,165,430 B2 | 1/2007 | Weidmer | |
| 7,172,787 B2 | 2/2007 | Torigoe et al. | |
| 7,188,416 B1 | 3/2007 | Woehlke et al. | |
| 7,415,958 B2 | 8/2008 | Boehm et al. | |
| 7,533,657 B2 | 5/2009 | Onodera | |
| 7,568,273 B2 | 8/2009 | Iizumi et al. | |
| 7,607,209 B2 | 10/2009 | Iizumi et al. | |
| 7,758,910 B2 | 7/2010 | Moreau et al. | |
| 7,851,046 B2 * | 12/2010 | Nishimura et al. | 428/141 |
| 7,862,404 B2 | 1/2011 | Takashima et al. | |
| 7,982,435 B2 | 7/2011 | Masuda | |
| 8,103,485 B2 | 1/2012 | Plett | |
| 8,209,831 B2 | 7/2012 | Boehm et al. | |
| 2003/0052650 A1 | 3/2003 | Gunji | |
| 2004/0079556 A1 | 4/2004 | Cramer et al. | |
| 2005/0064146 A1 | 3/2005 | Hollis et al. | |
| 2005/0137829 A1* | 6/2005 | Gimelfarb et al. | 702/171 |
| 2006/0021809 A1 | 2/2006 | Xu et al. | |
| 2006/0100833 A1 | 5/2006 | Plett | |
| 2007/0000129 A1 | 1/2007 | Hahn et al. | |
| 2007/0012177 A1 | 1/2007 | Miyamoto et al. | |
| 2008/0244891 A1 | 10/2008 | Iizumi et al. | |
| 2008/0245226 A1 | 10/2008 | Iizumi et al. | |
| 2008/0252412 A1 | 10/2008 | Larsson et al. | |
| 2008/0260958 A1 | 10/2008 | Sekikawa et al. | |
| 2009/0031564 A1 | 2/2009 | Meier | |
| 2009/0058366 A1 | 3/2009 | Masuda | |
| 2009/0175571 A1 | 7/2009 | Boehm et al. | |
| 2010/0031799 A1 | 2/2010 | Ast et al. | |
| 2010/0101526 A1 | 4/2010 | Schaefer et al. | |
| 2010/0139607 A1 | 6/2010 | Herbst-Dederichs et al. | |
| 2011/0000085 A1 | 1/2011 | Kanai et al. | |
| 2011/0023777 A1 | 2/2011 | Nishimura et al. | |
| 2011/0030663 A1 | 2/2011 | Verpoort et al. | |
| 2011/0297118 A1 | 12/2011 | Izawa et al. | |
| 2012/0018407 A1 | 1/2012 | Schramm et al. | |

FOREIGN PATENT DOCUMENTS

| | | |
|---|---|---|
| DE | 4447514 A1 | 2/1996 |
| DE | 19919024 | 11/2000 |
| DE | 102005055984 A1 | 5/2007 |
| DE | 60131096 | 2/2008 |
| DE | 102006045275 | 2/2008 |
| DE | 102006057641 A1 | 6/2008 |
| DE | 102008022225 | 11/2009 |
| DE | 102008024313 | 12/2009 |
| DE | 102008058452 | 2/2010 |
| DE | 102009008741 | 8/2010 |
| DE | 102010014689 | 10/2011 |
| EP | 0716158 | 6/1996 |
| EP | 0816527 | 1/1998 |
| EP | 0903422 | 3/1999 |
| EP | 0919715 | 6/1999 |
| EP | 1408134 A1 | 4/2004 |
| EP | 1416063 A1 | 5/2004 |
| EP | 1504833 | 2/2005 |
| EP | 1559807 | 8/2005 |
| EP | 1559807 A1 | 8/2005 |
| EP | 1854903 | 11/2007 |
| EP | 1967601 A2 | 9/2008 |
| JP | 2001245457 | 9/2001 |
| JP | 2001246352 | 9/2001 |
| JP | 2005336556 | 12/2005 |
| JP | 2006097045 | 4/2006 |
| JP | 2006097046 | 4/2006 |
| JP | 2007277607 | 10/2007 |
| JP | 2008111582 | 5/2008 |
| JP | 2010209454 A1 | 9/2010 |
| JP | 2010275898 | 12/2010 |
| RU | 2297314 | 4/2007 |
| SU | 1310181 | 5/1987 |
| WO | 0037789 | 6/2000 |
| WO | 2005040446 | 5/2005 |
| WO | 2005273425 | 8/2005 |
| WO | 2006061710 | 6/2006 |
| WO | 2007007821 | 1/2007 |
| WO | 2007087989 | 8/2007 |
| WO | 2008034419 | 3/2008 |
| WO | 2010015229 | 2/2010 |
| WO | 2011161346 | 12/2011 |

OTHER PUBLICATIONS

Peter Ernst, Gerard Barbezat, Thermal Spray Applications in Powertrain Contribute to the Savings of Energy and Material Resources, Sulzer Metco AG Switzerland, Rigackerstrasse 16, 5610 Wohlen, Switzerland.

Journal of Thermal Spray Technology, JTTEE5 16: 181-182, In The News, Conference and Workshop Information, vol. 16(2) Jun. 2007.

European Patent Office, European Search Report for the corresponding EP Application No. 10167055.2 mailed Oct. 11, 2011.

International Patent Bureau, International Search Report for the corresponding German Patent Application No. DE 10 2008 019 933.8 filed Apr. 21, 2008 and the PCT/EP2009/054670 filed Apr. 20, 2009.

German Search Report dated Mar. 8, 2010, pp. 1-2.

Non-final Office Action dated Dec. 12, 2013 for U.S. Appl. No. 13/538,151, filed Jun. 29, 2012.

Non-final Office Action dated Dec. 4, 2013 for U.S. Appl. No. 13/752,572, filed Jan. 29, 2013.

Eberhard Kretzschmar, The Metal Spraying Process and its Application in our history, Veb Carl Marhold Publishing House, Halle (Salle), 1953.

C. Verporrt, W. Blume, R Ehrenpreis, Ford Motor Company, ICES-2006-1391, Proceedings of ICES2006, Therma Spraying of Aluminum Cylinder Bores by the Ford PTWA Spray Process, 2006 Internal Combustion Engine Division Spring Technical Conference May 7-10, 2006, Aachen, Germany.

Applicants' Statement of Relevance in Accordance With 37 C.F.R. 1.98(a)(3)(i) for IDS Reference JP 2001-245457.

Japanese Patent Office, Japanese Office Action for Japanese Patent Application No. 2010-139542.

* cited by examiner

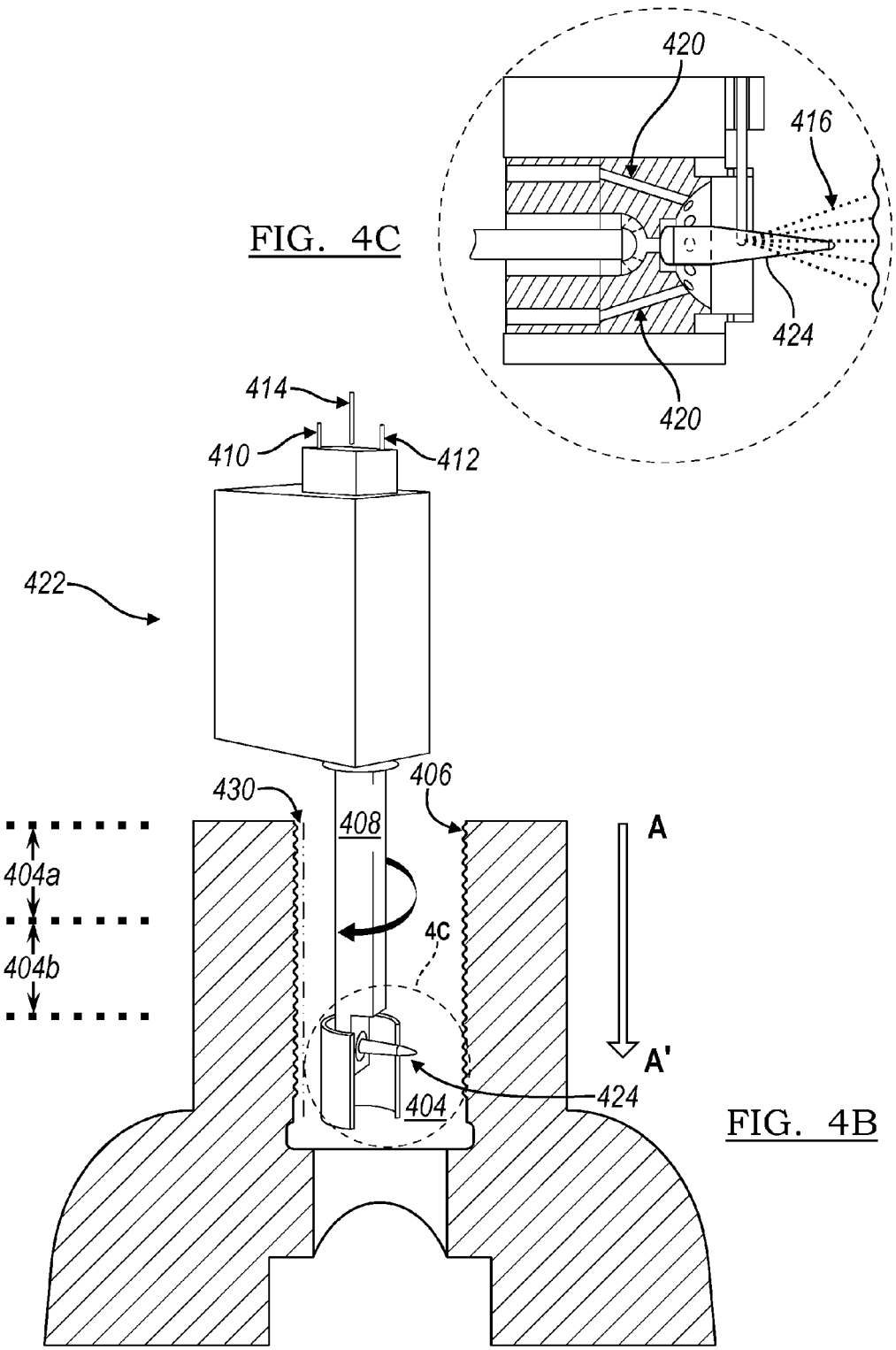

METHOD OF DETERMINING COATING UNIFORMITY OF A COATED SURFACE

TECHNICAL FIELD

The present invention relates to a method of determining coating uniformity of a coated surface.

BACKGROUND

Surface coatings are often applied to articles such as engine cylinder bores for an internal combustion engine. In one application, a thermal spray gun moves to coat a stationary surface, sometimes with several passes to build a desirable thickness for the coating. However, thermal spray coating method has been met with limited use partly due to variations or lack of uniformity in coating thickness. As a result, additional passes of the thermal spray gun may be needed to reduce the thickness variation, which may cause an overloading of the coating material. One disadvantage associated with overloading of the coating material is relatively high consumption of the coating material, which may increase production costs.

SUMMARY

A method for applying a coating includes: obtaining a subject cylindrical part including an inner subject coated surface applied using a spraying device at a first operating condition, the inner subject coated surface including a longitudinal axis and a cross-section, the cross-section intersecting the longitudinal axis at a center point and including end points located on an outer perimeter; measuring the inner subject coated surface to obtain subject coating data including distance values, each being a distance between the center point and one of the end points; comparing the subject coating data to standard coating data to obtain comparison data; and adjusting the spraying device based on the comparison data to have a second operating condition different from the first operating condition.

The method may further include receiving the standard coating data from a standard inner coated surface.

The method may further include reducing peak height of one or more coating spikes on the subject coated surface. The step of reducing may be carried out by contacting the one or more coating peaks of the subject coated surface with an abrasive. The step of reducing may be carried out by contacting the one or more coating peaks of the first coating with silicon carbide.

The distance values may be obtained by measuring coordinate x, coordinate y and coordinate z values of each of the end points of the cross-section.

BRIEF DESCRIPTION OF THE DRAWINGS

FIG. 4B illustratively depicts a cross-sectional view of a spraying gun in operational relationship with a cylinder bore referenced in FIG. 4A;

FIG. 4C illustratively depicts an enlarged view of a portion depicted in FIG. 4B;

DETAILED DESCRIPTION

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Figure 4A:
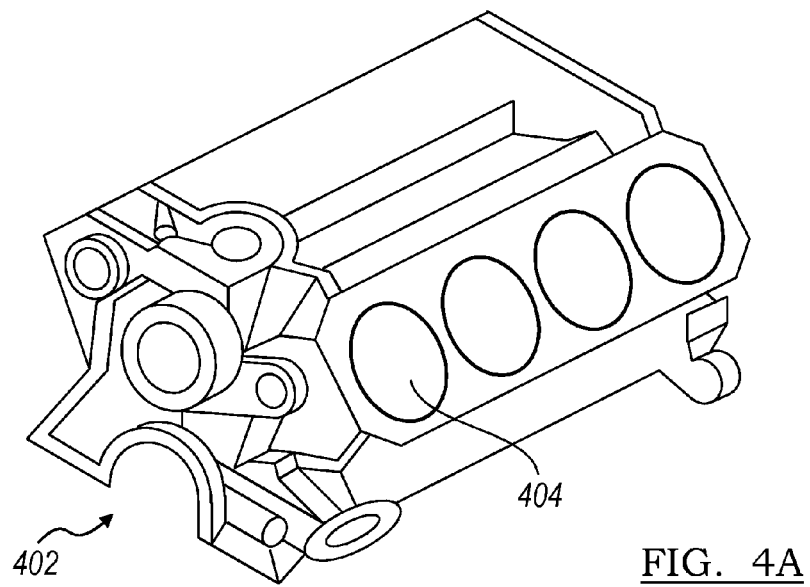
FIG. 4A illustratively depicts a perspective view of an engine block having cylinder bores with coating thickness controllable using the method referenced in FIG. 1.

Typically, and as depicted in FIGS. 4A to 4C, an engine block 402 of an internal combustion engine (not shown) has one or more cylinder bores 404. The cylinder bores 404 may be formed from and defined by a wall of metal material such as steel, iron and aluminum. In this connection, engine blocks 402 formed from relatively light weight metals such as aluminum may be preferred over their steel or iron counterparts to reduce weight and to improve fuel economy.

When aluminum is used, certain steps are in place to secure requisite strength and wear resistance. One method is to employ cylinder liners inside and next to the cylinder bores. An alternative method is to apply metallic coatings onto an interior surface of the aluminum cylinder bores such as the cylinder bore 404 which may essentially function as a cylinder liner.

Thermal spraying may be used to apply a coating on an interior surface 406 of the cylinder bore 404 using a thermal spray gun 422 configured to spray molten coating material. In general, the coating is deposited by moving the thermal spray gun 422 in a longitudinal direction A-A' inside the cylinder bore 404, optionally with the thermal spray gun 422 rotating.

Thermal spraying can be carried out in any suitable manner. U.S. Pat. No. 5,622,753 discloses a representative method of thermal spraying. As illustratively depicted in FIG. 4B, two wires 410 and 412 are fed down a rotatable and reciprocating shaft 408 and directed to have their tips 420 closely spaced to permit creating an arc through which a gas passes. Electrical current may be passed through the wires 410 and 412 so as to create the arc across the tips 420 while pressurized gas may be directed between the tips 420 to spray molten droplets from the coating material inlet 414. The thermal spray gun generally shown at 422 includes a gun head 424, creating a spray 416 of molten metal droplets. A plasma creating gas (such as air, nitrogen or argon) possibly mixed with some hydrogen, is directed through the arc to be heated to a temperature that creates a stream of hot ionized electrically conductive gas. The molten droplets are projected as a spray 416 onto the surface 406 of the cylinder bore 404.

As the thermal spray gun 422 moves along the longitudinal axis A-A' of the cylinder bore 404, variations in the coating thickness may develop, which may worsen with an increase in coating time and equipment fatigue. Variations in coating thickness, particularly coating bulges, can be disadvantageous because (i) it introduces greater heat to the coating at such bulge, leading to possible "hot spots" or residual thermal stress, and (ii) the bulging can possibly lead to disbanding as a result of an excessive shrinkage rate in the coating when the thermal spray gun moves away. If the coating thickness is not sufficiently uniform, a thicker average coating may be needed to be applied to ensure that a minimum thickness is met at all points, increasing material consumption, coating cycle time, and/or machining (honing) time.

Coating variation may occur due to a number of reasons. Without wanting to be limited to any particular theory, it is believed that changes in air flow along the longitudinal axis A-A' of the cylindrical bore 404 are likely attributable to the coating irregularity or non-uniformity. In this connection, air flow changes with the position of the shaft 408 relative to the cylindrical bore 404. What comes with a relatively higher air flow is a relatively more coating material fly-off or loss. In certain particular instances, relative to a lower section 404b of the cylindrical bore 404, an upper section 404a of the cylindrical bore 404 may experience greater air flow and hence thinner coating layer, provided that all other conditions are equal.

In one or more embodiments, a method is provided for determining coating uniformity of a subject coated surface coated via a spraying device, the subject coated surface including a longitudinal axis and closed-loop cross-sections extending in the longitudinal axis, the coated surface including one or more first thickness values on a first closed-loop cross-section and one or more second thickness values on a second closed-loop cross-section, the first and second cross-sections being spaced apart in the longitudinal direction, the method includes: measuring with the subject coated surface to obtain subject coating data, the subject coating data including the one or more first thickness values and the one or more second thickness values; comparing the subject coating data and standard coating data to obtain comparison data; and determining the coating uniformity of subject coated surface using the comparison data.

Figure 1:
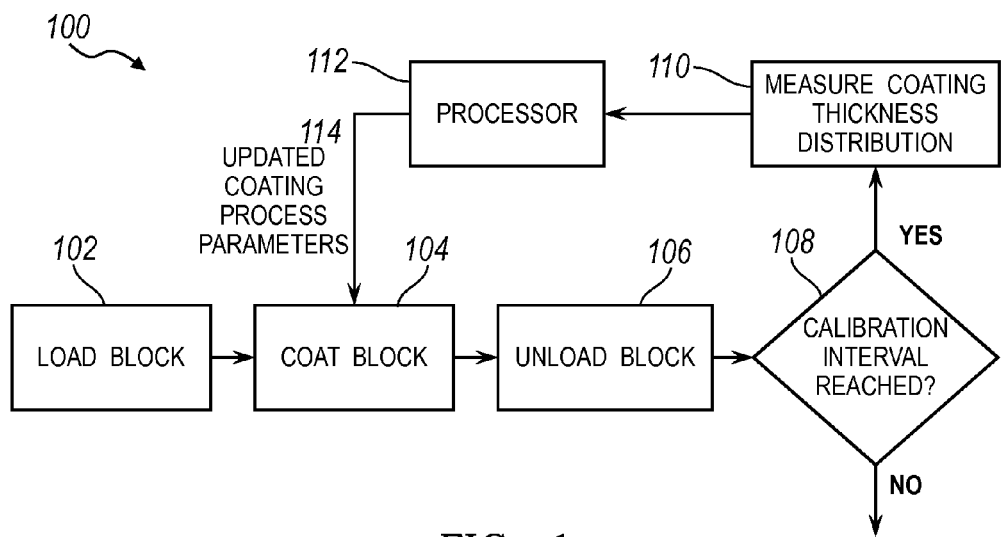
FIG. 1 illustratively depicts a process flow for a method of controlling coating uniformity according to one or more embodiments.

FIG. 1 depicts a method generally shown at 100 according to one or more embodiments of the present invention. At step 102, a cylinder block such as block 402 is loaded in a receptacle in operational engagement with a thermal spray gun. The cylinder block 402 and particularly the engine bore 404 of the cylinder block is coated with the thermal spray gun. In operation, the entire engine block 402 may be received by and positioned on the spray platform and spraying coating is done on one bore at a time, as indicated at step 104. Once all bores 404 are coated for a given engine block 402, the engine block 402 may be detached from the coating booth and the coating process may start again for the next block. During the measurement time interval, more than one cylinder bores may be coated and hence released from the coating production line. When the measurement time interval arrives, that particular cylinder bore may be measured for coating thickness distribution and uniformity according to the measurement detailed described herein elsewhere. The coating profile distribution and uniformity information may then be processed at step 112. Output information from step 112 may take one or more forms, including a command or signal to increase or decrease spray velocity, among others. At step 114, the command or signal generated at step 112 is materialized or put into operation. An incoming cylinder bore is then coated with the updated operation parameters.

This method of controlling coating uniformity can be implemented at startup of and/or periodically during a coating production. The time intervals at which the subject coating data is obtained and the comparison is conducted between the subject and standard coating data may be of any suitable value in time. Likely the time interval may be adjusted based on the how much variation is revealed according to the comparison data. Non-limiting examples of the time intervals are 2 hours, 4 hours, 6 hours, 8 hours, 10 hours, 12 hours, and 24 hours.

Due to the associated cost, a user may only use one spray gun and adopt an in-line process wherein each of the to-be-coated articles are received within a coating receptacle, one by one, to be coated by the spray gun. For the purpose of obtaining the subject coating data, one or more of the coated articles coated at a first time point may be used to obtain the subject coating data; and the resultant comparison data may be used to adjust operational parameters of the spray gun such that adjustments for coating one or more articles to be coated at a second time point.

Referring back to FIG. 1, if the quality control loop including one or more steps of 106, 108, 110, 112 and 114 can be carried out fast enough, the coating uniformity control method can even be implemented in a batch process. In this connection, a coating uniformity control method starts at step 104 with a subject article, the coating may be temporarily paused while operating parameters of the spraying gun may be adjusted based on the existing coating information from the subject article. Spraying may continue shortly thereafter on the same subject article with the same spraying device now with one or more its operating parameters updated.

The subject coating data is measured to include data on coordinate x, coordinate y and coordinate z via the use of a coordinate measurement machine. In a non-limiting example, the subject coating data may be obtained via the use of coordinate measurement machine (CMM). CMMs may be commercially available, for instance, available from Zeiss, Brown and Sharp. The CMM equipment includes one or more movable arms, each equipped with one or more position probes. During measurement, the position probes detect the position of each of the targeted spots on the sprayed coating and a data set in the form of position values on the x, y and z axis of each targeted spot is collected, stored and subsequently processed for comparison. In this connection, many targeted spots per a cross-sectional ring of the sprayed coating can be measured for the positional value, and the positional data for all these targeted spots per the cross-sectional ring form a 3-dimensional contour of the cross-sectional ring. Along the longitudinal axis of the cylindrical bore 404, similar selection of a cross-sectional ring and corresponding contour formation can be generated for the cross-sectional rings in any suitable number.

Compared to conventional mechanical gauges, current or magnetic gauges, and ultrasonic probing gauges, CMM may be more suitable for the instant method as CMM is relatively faster and cost effective.

Subject coating data may be obtained with optical profilometry techniques, wherein measurements can be carried out by a variety of techniques such as optical triangulation, interferential techniques or others. These techniques may make it possible to determine the surface profile of the parts without contact. Optical profilometry may be used to supplement the CMM techniques, particularly in areas where the CMM probes may not readily reach. These areas may include sharp turns and hidden corners on a given spray coating.

Figure 2:
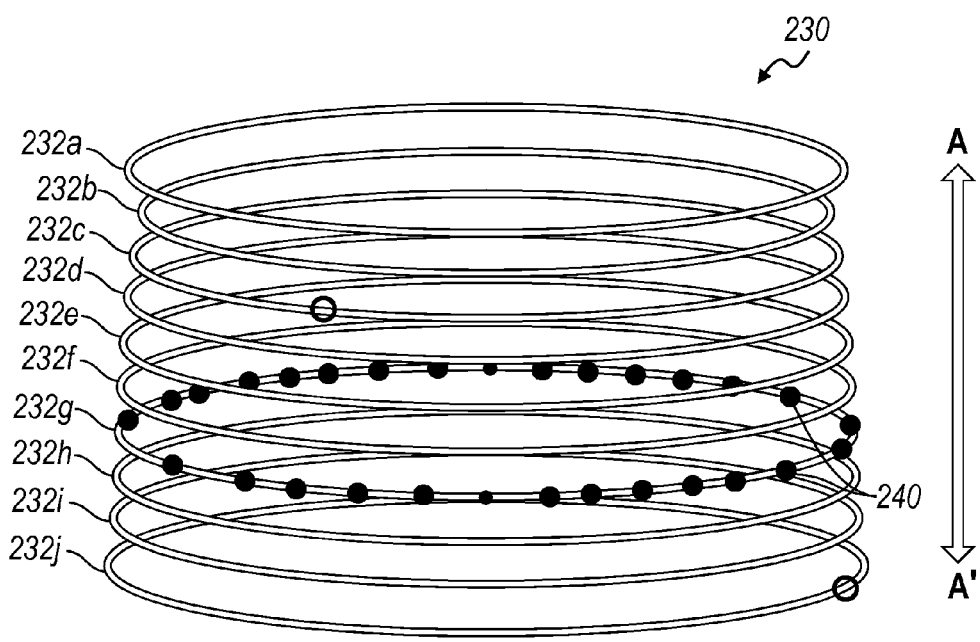
FIG. 2 illustratively depicts a wireframe plot of a subject coating data using the method referenced in FIG. 1.

FIG. 2 depicts a non-limiting example of the coating profile in a general spiral shape taken along the longitudinal axis A-A' of the cylinder bore 404. The coating profile is alternatively named the wireflame plot, representing a 3-dimensional outer contour of the spray coating. As illustratively depicted in FIG. 2, a number of close-loop cross-sectional rings 232a to 232j of the spray coating 230 are selected for the CMM measurement. Although only 10 rings are selected for FIG. 2, any suitable number of the rings may be chosen depending upon particular needs of a project. To generate the CMM measurements in relation to each of the rings 232a to 232j, measurements may be taken at a number of locations 240 on that ring. The number of measurements 240 can be of any suitable number, for instance, from several hundred up to several thousands. Of course, the ring profile will likely match more closely to the actual coating contour with more measurements taken. However, this accuracy may need to be balanced out with the amount of time and cost allowed in a given project.

The method of controlling coating uniformity may further include reducing peak height of one or more coating peaks of the subject coated surface. Often times the coating peaks are unavoidable and unpredictable, and vary in peak height along the moving direction of the spray gun. The coating peaks are extensions above and beyond the main coating mass; therefore, their presence may introduce unnecessarily high background noise to a downstream coating measurement. This reducing step may be carried out by contacting the one or more coating peaks of the subject coated surface with an abrasive. This reducing step may also be carried out by contacting the one or more coating peaks of the first coating with silicon carbide. In a non-limiting example, the presence of the coating peaks may be reduced by the use of a brush hone. The brush hone may be mounted in a drill motor and run up and down several times to clean off the peaks. For the purpose of reducing the coating peaks, the brush hone includes an abrasive. The abrasive can include any suitable materials. Non-limiting examples of the abrasive include silicon carbide and aluminum oxide.

In another embodiment, the method may further include, prior to the step of measuring, receiving the standard coating data from a standard coated surface. The subject coating data may be obtained in the form of coating thickness values along a helical path in the longitudinal axis of the subject coated surface.

The step of comparing the subject coating data to the standard coating data and/or the step of making adjustments to the spray gun in view of the comparison may be done manually if a user is dealing with a manageable volume and may be done with computational assistance. Although not necessary to carry out this comparison, a computerized automation is beneficial in instances where coating volume is high enough such that manual inspection may not be adequate.

One or more coating-deposition parameters of the spraying device may be adjusted according to the comparison data. The step of adjusting may include adjusting a transverse speed of the spraying device. Non-limiting examples of the coating-deposition parameters include axial or stroke speed, wire feed rate, gas pressure, air pressure, gas flow, air flow, amperage, upper torch set points, lower torch set points, rotating speed, and torch plume shape. In particular, the axial speed or stroke speed is the speed at which the torch moves up and down the cylinder bore.

The output is to increase an axial rate of the spraying device if the subject average thickness is greater than the standard average thickness.

The step of adjusting may be carried out by inputting the subject coating data into a feedback control unit having an output to adjust the one or more coating-deposition parameters. In this connection, the feedback control unit may be provided on the spraying device.

The feedback control unit may calculate a subject average diameter of the subject coating data and compares the subject average diameter to a standard average diameter.

Referring back to FIG. 4B, a thermally sprayed coating 430 may be formed on the interior surface 406 of the cylinder bore 404. The shaft 408 of the thermal spray gun 422 supports and moves the gun head 424 for coating the interior surfaces 406 of the cylinder bore 404. The shaft 408 supports the gun head 424 at one end and includes channels (not shown) at the other end for supplying wires and gases to the gun head 424. The shaft 408 may be supported by a rotary drive such that the shaft 408 rotates about its own axis or an axis parallel thereto. The rotary drive may, in turn, be supported on a linear traverse mechanism or a slide that moves the rotary drive up and down. Thus, the gun head 424 moves up and down, while being rotatable, within the cylinder bore 404. The thermal spray gun 422 may move at a uniform speed to coat the interior surface 406, sometimes with several passes to build a desirable thickness of the coat.

A non-limiting example of the spray gun is a rotating and axially reciprocating torch such as the spray gun 422 referenced in FIG. 4B herein. In this connection, the torch reciprocates, or moves up and down, in the longitudinal axis A-A' of the cylinder bore 404.

Prior to the spray coating, mechanical roughening for surface preparation may be employed. Although not necessarily excluding the use of a base coating, the present method does not need the base coating to enhance adhesion of the coating material to the bore. As base coating often involves the use of expensive metal materials, the flexibility of not having to use a base coating provides additional cost benefits. When and after the interior surface 406 is prepared, for instance by machine roughening, a coating may be applied in a plurality of passes of the gun head 424 of the thermal spray gun 422 within the cylinder bore 404. Any suitable coat material can be used. A non-limiting example of the coat material is a carbon steel material.

Figure 5A:
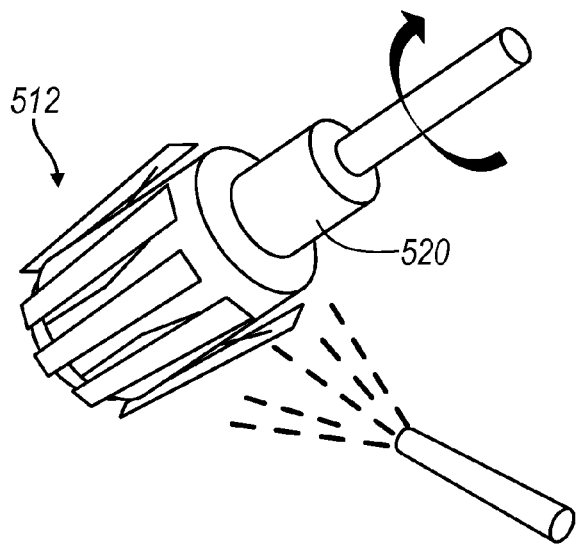
FIG. 5A in view of FIG. 5B illustratively depicts a cross-sectional view of a honing apparatus in operational relationship with a cylinder bore referenced in FIG. 4A.
Figure 5B:
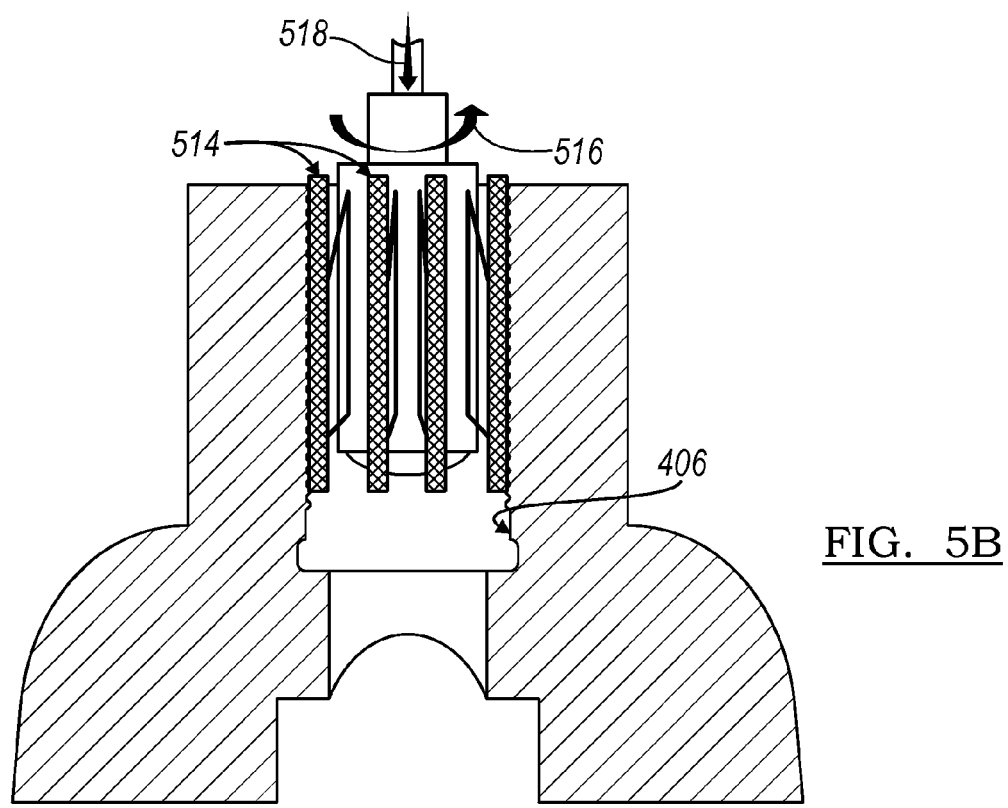

After the thermally sprayed coating 430 is formed, it is finished using a finishing method such as honing. Honing can be carried out in any suitable manner. U.S. Pat. No. 5,622,753 discloses a non-limiting example of a honing method. In general and as illustratively depicted in FIGS. 5A and 5B, a honing tool 512 may include a radially expandable holder 520 carrying a plurality of honing stones 514, which lightly brings the stones 514 against the interior surface 406 of the cylinder bore 404 as the honing tool 512 rotates and reciprocates in the directions of 516 and 518, respectively. In this connection, the honing stones 514 each have an outer surface with a radius complementary to the internal radius of the interior surface 406. The honing stones 514 may be formed of an abrasive material including, but not limited to, silicon carbide, aluminum oxide, boron nitride and diamond. Prior to the thermal spray coating, the interior surface 406 may be pre-treated to strip the interior surface 406 free of oxides to promote mechanical bonding. Moreover, before, during and/or after the honing, the interior surface 406 may be washed with a solution that can be used as a coolant during the honing step or as an independent spray wash liquid after honing has been completed. Spray washing may be used as it uses considerably less solution or water than other methods.

The to-be-coated articles can be any objects suitable to be coated by a spray gun, for instance, cylindrical engine bores. The articles may include automotive components or non-automotive components. Non-limiting examples of the articles include precision bores in engines, pumps and compressors. In certain particular instances, the articles include automotive engine bores.

Having generally described several embodiments of this invention, a further understanding can be obtained by reference to certain specific examples which are provided herein for purposes of illustration only and are not intended to be limiting unless otherwise specified.

EXAMPLE

Example 1

Figure 3:
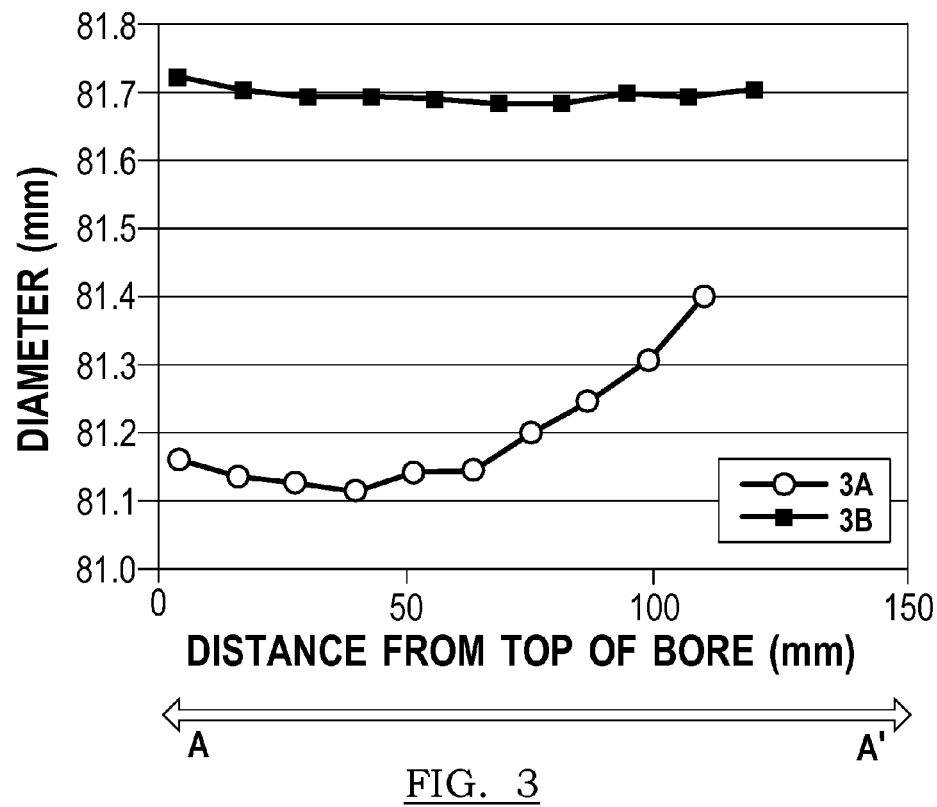
FIG. 3 illustratively depicts a comparison between a subject coating data using the method referenced in FIG. 1 and control coating data using conventional method.

FIG. 3 shows bore diameter values taken from the cross-sectional rings 232a to 232j referenced in FIG. 2 as a function of distance from top of bore. Plot 3B records bore diameter values with the spray gun moving in a constant speed and plot 3A records bore diameter values with the spray gun moving in a speed setting that has taken into consideration the observed coating irregularities reported in plot 3B. The consideration includes managing the spray gun 422 to move relatively faster where the bore diameter values are relatively smaller as depicted in plot 3B. Plot 3A shows that the bore diameter significantly increases from mid-point of the bore 404 and down in the direction of A-A'. It is not clear as to the exact causes underlying the observed phenomena. However, and as proposed herein elsewhere, changes in surrounding airflow possibly as a result of the movement of the spray head 424 along the longitudinal direction A-A' of the bore 404 may very well contribute to the observed coating irregularities.

Example 2

Figure 6A:
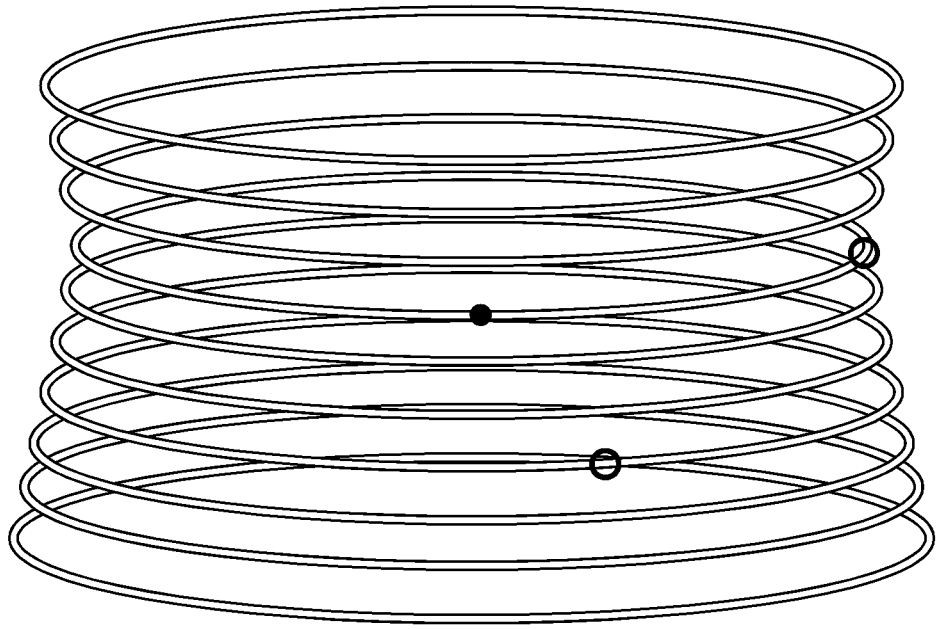
FIG. 6A illustratively depicts a perspective view of a coating profile using a control method.
Figure 6B:
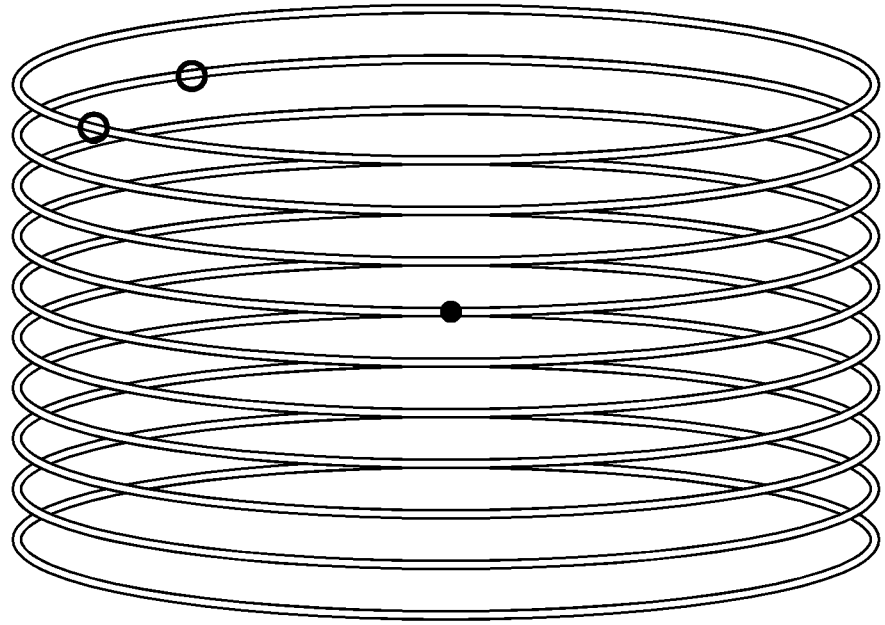
FIG. 6B illustratively depicts a perspective view of coating profile using a method according to one or more embodiments.
Figure 7:
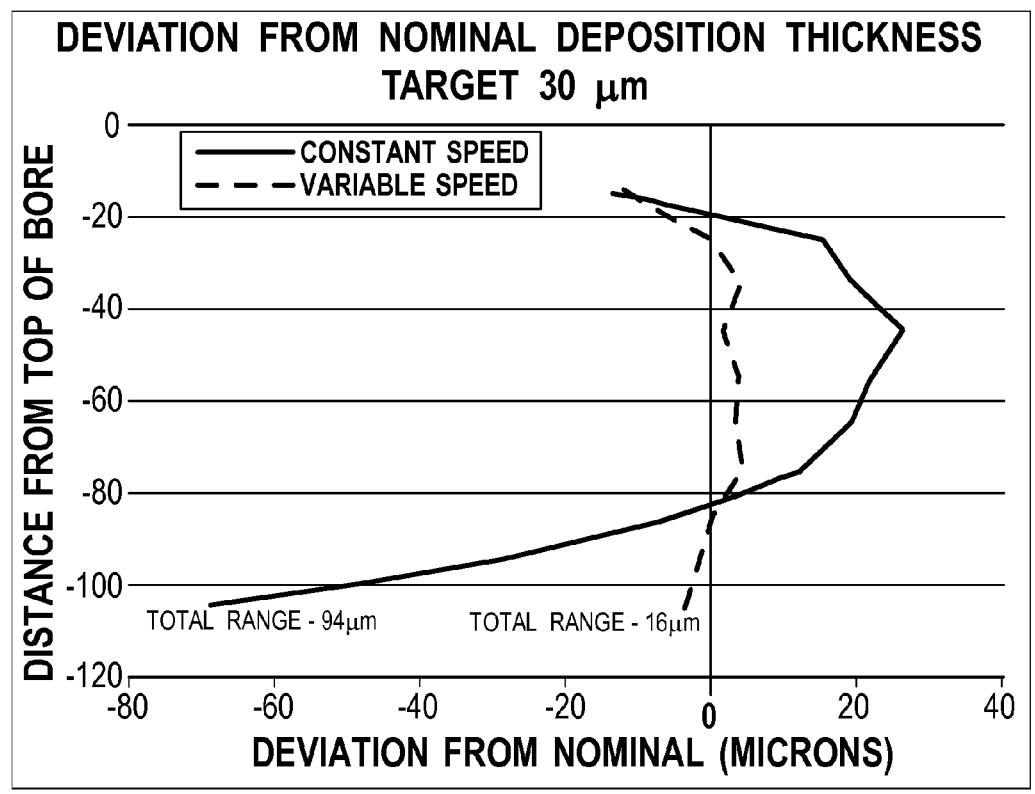
FIG. 7 illustratively depicts thickness deviation plots corresponding to the coating profiles referenced in FIGS. 6A and 6B.

Coating profiles are obtained via the use of CMM. FIGS. 6A and 6B show coating profiles of a first test bore coating coated with constant speed spraying and a second test bore coating coated with variable speed based on comparison data. As can be seen from FIG. 6A, the coating is deposited without an adjustment on the spraying device based on the comparison data, with the coating profile showing bell-mouth and a large diameter variation from top to bottom. A diameter variation for the first test bore coating is reported to be 285 um. As can be seen from FIG. 6B, bore diameter variation reduces visibly upon an adjustment on the spraying device operation based on the comparison data. A diameter variation for the second test bore coating is reduced to be about 51 um. FIG. 7 depicts deviation from deposition thickness target of 30 um for the first and second test bores referenced in FIGS. 6A and 6B.

While the best mode for carrying out the invention has been described in detail, those familiar with the art to which this invention relates will recognize various alternative designs and embodiments for practicing the invention as defined by the following claims.

What is claimed:

1. A method for improving coating uniformity across first and second cylindrical parts comprising:
   providing a first cylindrical part having a first inner surface coating along its length that is axially applied at a first axial speed setting using a spraying device;
   measuring a first and second diameter of the first inner surface coating at a first and second position, respectively, along the length of the first cylindrical part;
   comparing the first and second measured diameters with a standard inner surface coating diameter to obtain adjustment instructions; and
   determining a second axial speed setting for applying a second inner surface coating to a second cylindrical part based on the adjustment instructions to improve coating uniformity across the first and second cylindrical parts.

2. The method of claim 1, wherein the second axial speed setting is comprised of a first and second axial speed for applying the second inner surface coating at first and second positions along the length of the second cylindrical part corresponding to the first and second positions along the length of the first cylindrical part.

3. The method of claim 2, wherein the first and second axial speeds are different.

4. The method of claim 1, wherein the first axial speed setting is a constant speed.

5. The method of claim 4, wherein if the first or second measured diameters is less than the standard inner surface diameter, then the respective first or second axial speed is determined by increasing the first axial constant speed.

6. The method of claim 5, wherein the first axial speed setting is a constant speed.

7. The method of claim 6, wherein if the first or second measured diameters is less than the standard inner surface diameter, then the respective first or second axial speed is determined by increasing the first axial constant speed.

8. The method of claim 1, wherein the determining step reduces the deviation from a nominal diameter for the second cylindrical part as compared to that of the first cylindrical part.

9. The method of claim 1, wherein the adjustment instructions include adjusting the axial speed of the spraying device.

10. A method for improving coating uniformity across first and second cylindrical parts comprising:
    providing a first cylindrical part having a first inner surface coating along its length that is axially applied at a first axial speed setting using a spraying device, the cylindrical part length extending along a z-axis;
    measuring a first and second diameter of the first inner surface coating at a first and second z-axis position, respectively;
    comparing the first and second measured diameters with a standard inner surface coating diameter to obtain adjustment instructions; and
    determining a second axial speed setting for applying a second inner surface coating to a second cylindrical part based on the adjustment instructions to improve coating uniformity across the first and second cylindrical parts.

11. The method of claim 10, wherein the second axial speed setting is comprised of a first and second axial speed for applying the second inner surface coating at first and second positions along the length of the second cylindrical part corresponding to the first and second positions along the length of the first cylindrical part.

12. The method of claim 11, wherein the first and second axial speeds are different.

13. The method of claim 10, wherein the determining step reduces the deviation from a nominal diameter for the second cylindrical part as compared to that of the first cylindrical part.

14. The method of claim 10, wherein the adjustment instructions include adjusting the axial speed of the spraying device.

15. A method for improving coating uniformity across first and second cylindrical parts comprising:

providing a first cylindrical part having a first inner surface coating along its length that is axially applied at a first axial speed setting using a spraying device, the cylindrical part length extending along a z-axis and cross-sections of the first cylindrical part extending in planes formed by an x- and y-axis;

measuring a first and second diameter of the first inner surface coating at a first and second z-axis position in first and second x-y planes, respectively;

comparing the first and second measured diameters with a standard inner surface coating diameter to obtain adjustment instructions; and determining a second axial speed setting for applying a second inner surface coating to a second cylindrical part based on the adjustment instructions to improve coating uniformity across the first and second cylindrical parts.

16. The method of claim 15, wherein the second axial speed setting is comprised of a first and second axial speed for applying the second inner surface coating at first and second positions along the length of the second cylindrical part corresponding to the first and second positions along the length of the first cylindrical part.

17. The method of claim 16, wherein the first and second axial speed are different.

18. The method of claim 15, wherein the first axial speed setting is a constant speed.

19. The method of claim 18, wherein if the first or second measured diameters is less than the standard inner surface diameter, then the respective first or second axial speed is determined by increasing the first axial constant speed.

20. The method of claim 15, wherein the determining step reduces the deviation from a nominal diameter for the second cylindrical part as compared to that of the first cylindrical part.

* * * * *